United States Patent
Schade

(10) Patent No.: US 9,632,966 B2
(45) Date of Patent: Apr. 25, 2017

(54) PORTABLE USB MASS STORAGE DEVICE

(71) Applicant: International Microsystems, Inc., Milpitas, CA (US)

(72) Inventor: Peter A. Schade, Fremont, CA (US)

(73) Assignee: International Microsystems, Inc., Milpitas, CA (US)

( * ) Notice: Subject to any disclaimer, the term of this patent is extended or adjusted under 35 U.S.C. 154(b) by 0 days.

(21) Appl. No.: 14/809,135

(22) Filed: Jul. 24, 2015

(65) Prior Publication Data

US 2015/0363347 A1    Dec. 17, 2015

Related U.S. Application Data

(63) Continuation of application No. 14/275,711, filed on May 12, 2014, now Pat. No. 9,104,384.

(60) Provisional application No. 61/822,611, filed on May 13, 2013.

(51) Int. Cl.
| | |
|---|---|
| *G06F 1/16* | (2006.01) |
| *G06F 13/40* | (2006.01) |
| *G06F 1/18* | (2006.01) |
| *G06F 13/42* | (2006.01) |

(52) U.S. Cl.
CPC .......... *G06F 13/4068* (2013.01); *G06F 1/183* (2013.01); *G06F 13/4282* (2013.01)

(58) Field of Classification Search
CPC ....... G06F 1/183; H04M 1/6083; H04L 63/18
USPC .......... 235/441, 492; 726/19, 28, 21, 27, 22, 726/29, 4; 455/456.1, 436, 414.1, 411, 455/415, 404.1, 550.1, 575.3, 558, 347, 455/419, 556; 365/189.01, 185.33, 365/185.17, 148, 63, 185.22, 185.18, 365/189.05, 185.03, 185.2; 711/163, 103, 711/154, 170, 160; 361/679.33, 679.57, 361/679.03, 679.21, 679.22, 679.26, 361/679.31, 679.34, 679.47, 679.52, 361/679.55, 679.27, 679.02
See application file for complete search history.

(56) References Cited

U.S. PATENT DOCUMENTS

| | | | |
|---|---|---|---|
| 6,944,701 B2 | 9/2005 | Yu et al. | |
| 7,454,531 B2 | 11/2008 | Shih | |
| 8,282,012 B2 | 10/2012 | Chen et al. | |
| 8,738,952 B1 | 5/2014 | Lachwani et al. | |
| 9,104,384 B2 * | 8/2015 | Schade | G06F 1/183 |
| | | | 361/679.32 |
| 2002/0185533 A1 | 12/2002 | Shieh et al. | |

(Continued)

OTHER PUBLICATIONS

The International Search Report and The Written Opinion of the International Searching Authority for International Application No. PCT/US2014/037890, mailed Oct. 3, 2014.

*Primary Examiner* — Hung Duong
(74) *Attorney, Agent, or Firm* — Brundidge & Stanger, P.C.

(57) ABSTRACT

A new type of portable USB mass storage gadget is disclosed which provides the user with upgradeable high speed mass storage and processing for use with portable computer appliances such as smart phones and tablets as well as standard desk top computers and laptops. Various modifications to the embodiment referred to as a UDRIVE are disclosed including a battery option, wireless connectivity, security, and additional internal electronics and external interfaces that allow processing of the data stored or sent to the portable gadget.

10 Claims, 9 Drawing Sheets

(56) References Cited

U.S. PATENT DOCUMENTS

| | | | |
|---|---|---|---|
| 2004/0209656 A1* | 10/2004 | Kitami | H04M 1/6033 |
| | | | 455/569.1 |
| 2007/0045417 A1 | 3/2007 | Tsai et al. | |
| 2008/0166898 A1 | 7/2008 | Hubert et al. | |
| 2011/0104954 A1 | 5/2011 | Zhao et al. | |
| 2012/0166582 A1* | 6/2012 | Binder | H04L 63/18 |
| | | | 709/217 |
| 2012/0179785 A1 | 7/2012 | Wu et al. | |
| 2013/0167226 A1 | 6/2013 | Lin | |

\* cited by examiner

PORTABLE USB MASS STORAGE DEVICE

CROSS-REFERENCE TO RELATED APPLICATION

Under 35 U.S.C. 120, this application is a Continuation Application and claims priority to U.S. application Ser. No. 14/275,711, filed May 12, 2014, entitled "PORTABLE USB MASS STORAGE DEVICE," which claims benefit under 35 USC 119(e) of U.S. Provisional Patent Application No. 61/822,611, filed on May 13, 2013, entitled "PORTABLE MASS STORAGE DEVICE," all of which are incorporated herein by reference in their entireties.

FIELD OF THE INVENTION

The present invention is directed to portable storage devices and more particularly to a large capacity portable storage device for use with modern electronic devices such as portable computers, smart phones and tablets.

BACKGROUND

Ubiquitous Computing is defined as "machines that fit the human environment instead of forcing humans to enter theirs". Current modern computing devices such as smart phones and tablets provide many features that allow the average person a myriad of computer services without requiring any special technical knowledge. In other words, smart phones and tablets provide low cost Ubiquitous Computing for the masses.

These ubiquitous computing devices normally do not include large amounts of memory and when needing access to mass storage typically rely on an external storage medium such as provided by a cloud internet service or a personal desk top computer. Often, however, a wireless connection to the internet or a wired connection to one's desk top computer may not be possible nor provide the speed or security required for the intended data transfer.

In addition, a single user may have multiple portable computing devices among which the user wishes to share large amounts of data. Current external mass storage solutions include USB devices that use 2.5" hard drives that are generally too large and bulky to be considered portable. An alternative solution is USB sticks which come in many small form factors and different mass storage sizes.

However, current solutions do not allow the user to easily upgrade or replace the mass storage and lack many of the features that are necessary or desirable for use with modern portable computing devices such as smart phones and tablets.

What is needed is a new portable high speed mass storage device that provides small, high speed, portable mass storage using standard embedded memory cards that is easily scalable by the user and easily sharable among common mobile computing devices as well as standard desk top computers and laptops. The present invention addresses such a need.

SUMMARY OF THE INVENTION

A USB portable gadget with replaceable standard embedded SSD memory cards that provides the user with high speed and high capacity portable mass storage that can easily be interfaced to existing and future portable computing devices such as smart phones and tablets as well as standard desk top computers and laptops is disclosed. The portable USB gadget comprises a removable Solid State Drive. The removable Solid State Drive is connected to a second electronic assembly providing an electronic bridge that connects the mass storage module to a USB device data channel; wherein the USB device data channel acts as the primary gadget USB interface. The USB device data channel being a USB type A male connector, which is capable of connecting to a USB host that can provide both data and or power interfaces. The portable USB gadget residing in a case that has a length, width and height dimensions of not more than 5 inches long, by 2 inches wide, by 1 inches thick and the case enclosing and protecting the primary USB type A male connector and its electrical contacts when not in use.

DETAILED DESCRIPTION

The present invention is directed to portable storage devices and more particularly to a large capacity portable storage device for use with modern electronic devices such as portable computers, smart phones and tablets. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein. Ubiquitous Computing is defined as "machines that fit the human environment instead of forcing humans to enter theirs". Current modern computing devices such as smart phones and tablets provide many features that allow the average person a myriad of computer services without requiring any special technical knowledge. In other words, smart phones and tablets provide low cost Ubiquitous Computing for the masses.

However, although smart phones and tablets provide much of the necessary computer power required by their users, they often do not incorporate suitable mass storage for all the data the user requires. Heavily dependent upon wireless connectivity to the Cloud for storage, these portable devices generally lack suitable local mass storage. Instead, the user may be forced to obtain the desired information through a number of means and from a variety of sources each with its own particular access method and retrieval software. For example, a business person making a presentation may require large data files but not have available or may not wish to use a third party connection to internet cloud storage.

Figure 1:
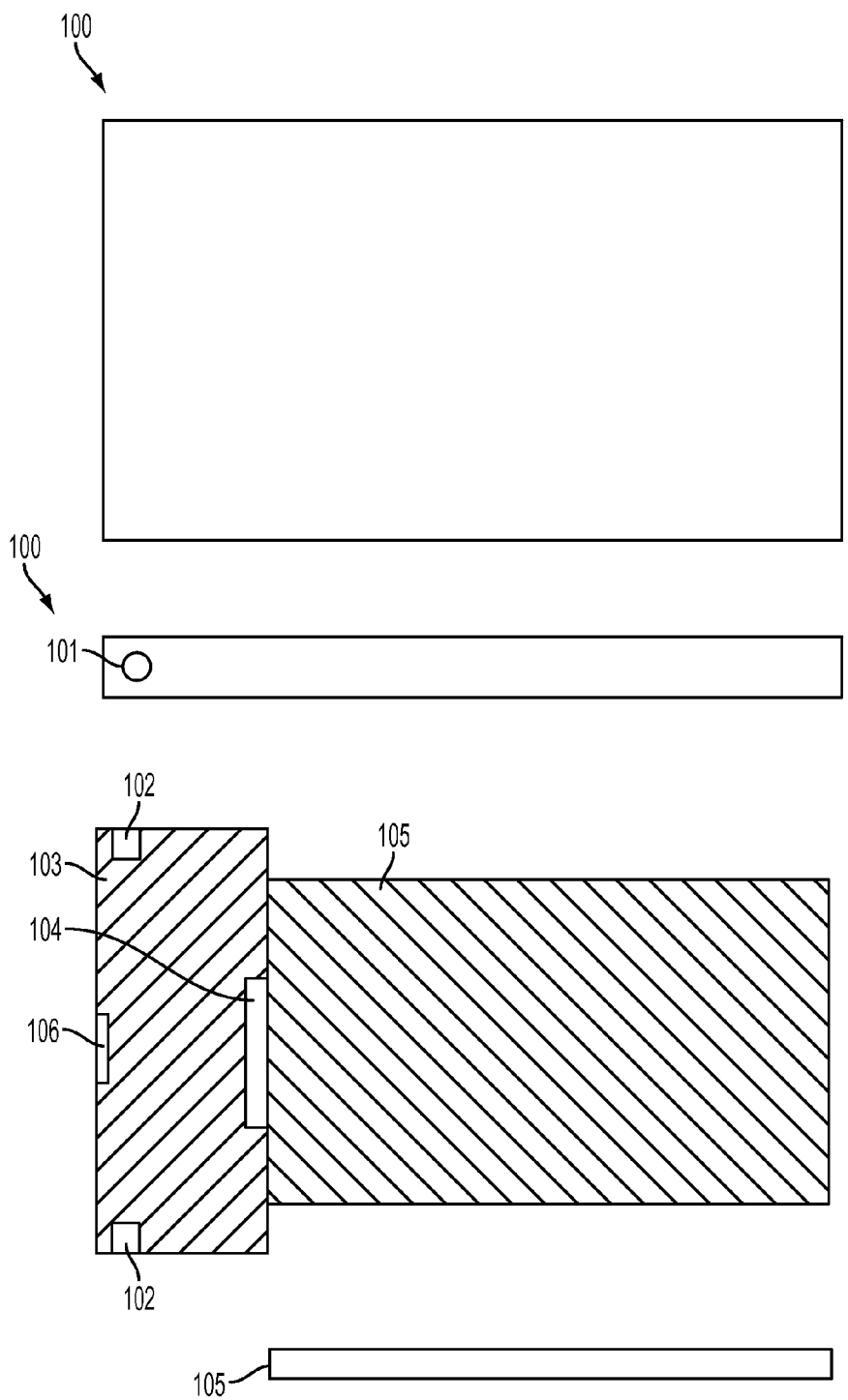
FIG. 1 shows a conventional USB external storage hard drive using an internal 2.5" storage device.

Present solutions for large portable mass storage include USB hard drives incorporating standard size 2.5" SATA drives in a case with a USB bridge to SATA assembly as shown in FIG. 1. Shown in FIG. 1 is the outside case, 100, which is held together using two screws 101, that secure the inner assembly 103 containing a USB bridge to SATA chip with the outside case. 104 is the connector between the bridge assembly, 103, and the SATA drive 105. 106 is a USB connector (typically a female USB device connector) into which plugs a USB cable (called a "USB dongle") made using two USB connectors that provide the physical connection the USB hard drive's USB device port and a compatible USB host.

USB hard drives with internal 2.5" SATA drives tend to be large devices when compared to smart phones and do not fit conveniently into one's pocket. Access to the internal drive is restricted and normally requires removable of a number of screws holding the case together. In addition, the typical USB dongle used with to these devices can be a foot long in length or longer. USB hard drives can consume a considerable amount of power especially when the internal SATA drive is a moving media (e.g. magnetic) SATA drive.

Figure 2:
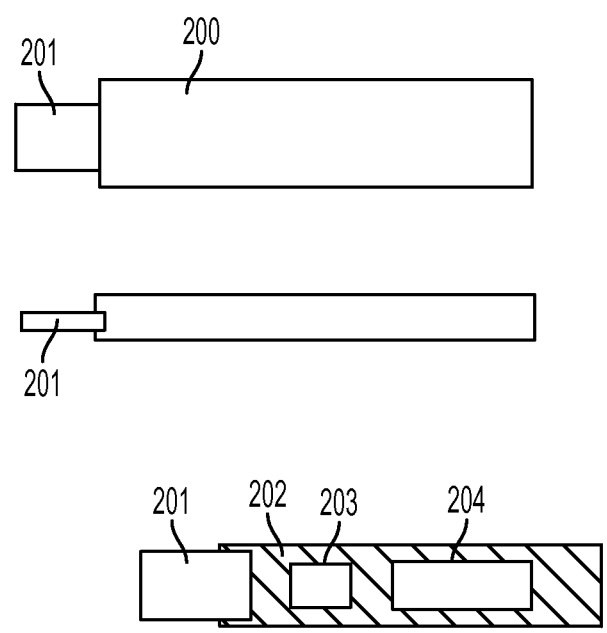
FIG. 2 shows a conventional USB stick with a fixed amount of storage.

Alternatively, the user requiring portable mass media may choose to store their data on a USB stick which is comparatively small in size and typically uses a USB type A male plug for connectivity to the USB host. An example of these devices is shown in FIG. 2. In FIG. 2, item 200 is the complete assembly. 201 is a USB type A male plug. 202 is the inner sub assembly holding all the electronics consisting of the USB type A male plug 201, the USB to Flash memory controller 203, and the Flash memory 204. Due to the normally tight spacing of adjacent USB sockets on standard desk top computers and the low cost advantages of a single electronic assembly, USB sticks do not normally provide the user with a means to change the internal Flash mass storage, nor provide wireless connectivity or contain their own power source.

A system and method in accordance with the present invention addresses these current limitations with a new class of portable USB mass storage devices utilizing standard removable solid state storage having high speed SATA or PCIe interfaces enclosed in a truly portable case that the user may easily connect to a USB host such as is found in smart phones and tablets as well as portable and desk top computers. We refer this combination of attributes as "UDRIVE".

Although some of the features of a particular UDRIVE may be novel, the attributes that are shared between all UDRIVE's are the following.

1. An electrical apparatus that is of small size. By small size, we mean the UDRIVE can be conveniently and safely carried in the pocket of a human being and can be held easily in the human palm. Given these requirements, the case dimensions should have a length less than 5 inches, a width less than 2 inches, and a thickness less than 1 inch.

2. An electrical apparatus with a minimum of two printed circuit boards of which one is a replaceable and upgradeable Solid State Drive (or "SSD") storage module such as a mSATA or M.2 embedded memory cards.

3. A USB device port with a USB male connector that can serve both as an electronic interface to UDRIVE electronics including access to the internal mass storage module as well as provide power for the UDRIVE electronics.

4. When the USB male connector in 3 above is not in use, the UDRIVE case completely covers and protects the USB connector and its electrical contacts.

Figure 3A:
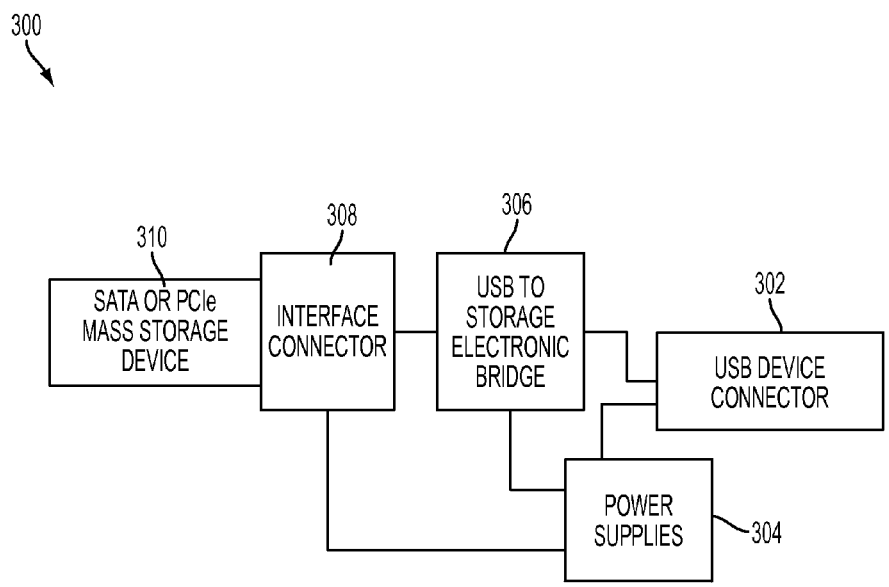
FIG. 3A shows a UDRIVE Basic Block Diagram in accordance with an embodiment.

The block diagram in FIG. 3A shows the UDRIVE 300 basic elements. The USB device port uses a USB male connector 302 as its serial data interface and main power source. The USB male connector 302 is coupled to power supply 304 and a USB to storage electronic bridge 306. The power supply 304 and the bridge 306 are coupled to an interface connector 308. The interface connector 308 is coupled to a SATA or PCIe storage device 310. When the UDRIVE male USB connector 302 is a type USB type A connector similar to the connectors used on standard USB sticks, the UDRIVE can be easily plugged into the standard USB type A female connectors found on USB hosts such as desktop computers, laptops, and USB power charging devices.

Many portable devices have different USB connector form factors. To accommodate these different form factors, various solutions are possible. One common method which can be used with a UDRIVE is to use an external cable called a USB "dongle" has been already described above.

Figure 3B:
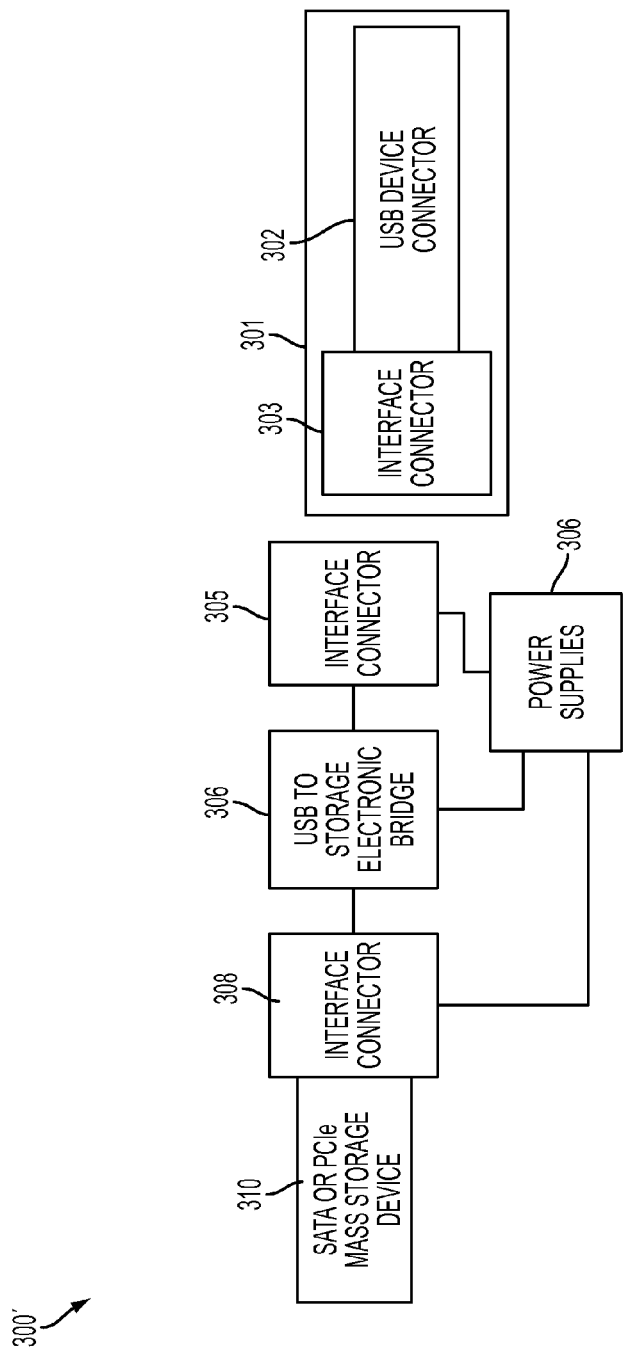
FIG. 3B shows a UDRIVE Block Diagram with Interchangeable USB Connector.

Dongles are very adaptable but are often inconvenient for the mobile user as it is another piece of equipment that is required for correct operation. To avoid the use of a dongle, another solution is to include in the UDRIVE a user interchangeable connector assembly that allows a large variety of USB connectors to be used in the UDRIVE including USB Type A Male, miniature USB male, micro USB male, etc. FIG. 3B shows a block diagram of a UDRIVE 300' with a removable USB connector assembly 301. The USB connector assembly 301 comprises a USB device connector 302 coupled to an interface connector 303 which is communicated with interface 305.

Figure 3C:
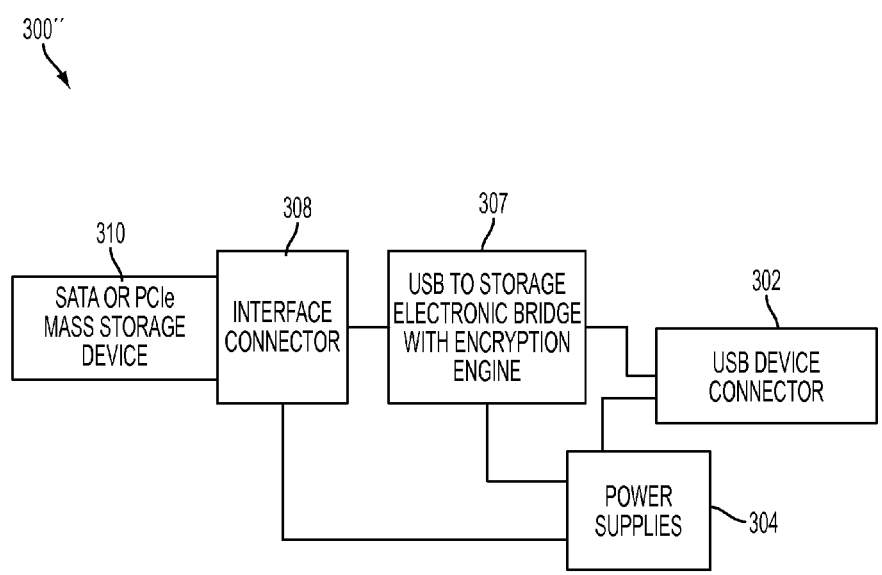
FIG. 3C shows a UDRIVE Block Diagram with a Hardware Encryption Engine.

Many users of portable devices wish to secure the data stored in the UDRIVE mass storage by adding a hardware encryption device to the UDRIVE electronics. FIG. 3C shows a block diagram of such a hardware encryption added to electronic bridge 307 of a UDRIVE device 300".

Figure 3D:
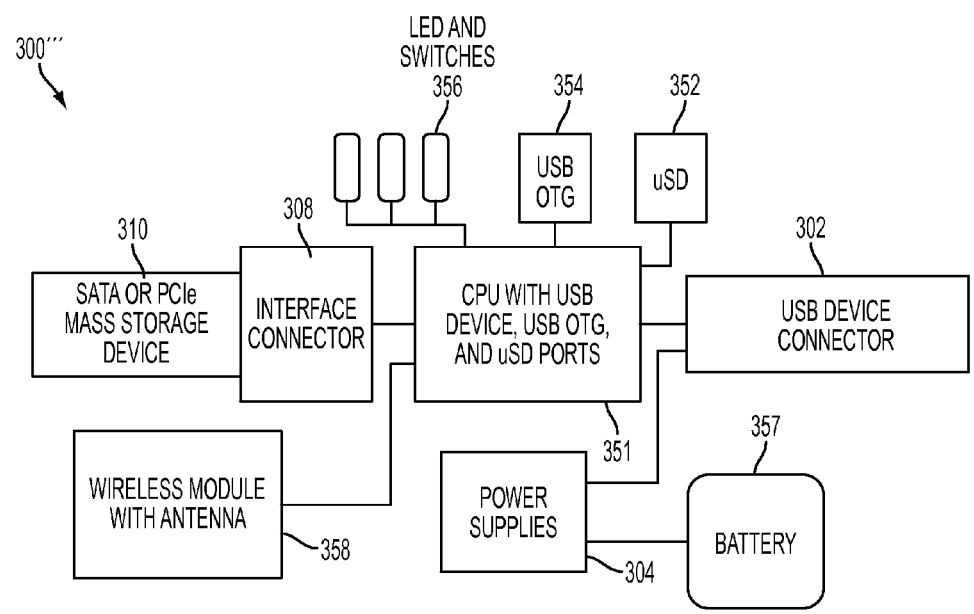
FIG. 3D shows a UDRIVE Block Diagram with Wireless Access to Mass Storage.

It is anticipated that the user of the UDRIVE may wish to allow other persons access to the UDRIVE mass storage via a wireless connection. To allow wireless access to the UDRIVE mass storage, a battery, CPU, and associated circuitry may be added to the UDRIVE electronics that provides a wireless access point and using standard wireless connections such as WiFi and or Blue Tooth. The block diagram for a UDRIVE 300" including a wireless module 358 is shown in FIG. 3D. With the addition of the battery 357 and the CPU 351 in FIG. 3D, additional circuitry is easily added such as a USB OTG port 354, a micro SD port 352, and simple switch inputs and LED's 356. These components are also shown in FIG. 3D.

Figure 4A:
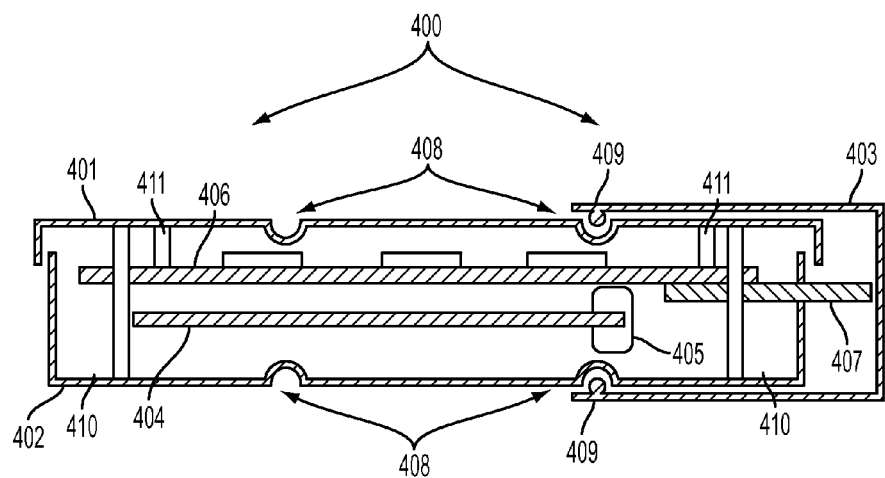
FIGS. 4A-4D show an embodiment of the invention utilizing a single USB male connector and a JEDEC standard MO-300 (mSATA) memory card.

The UDRIVE embodiment shown in FIGS. 4A-4D incorporates the basic features of an UDRIVE shown in the block diagram of FIG. 3A. FIG. 4A provides a detailed side view. The entire device is designated 400. The base consisting of a top, 401, and a bottom, 402, holds the UDRIVE electronics, consisting of the mass storage module, 404, the storage module interface connector, 405, which connects to the second electronic assembly, 406, which holds the USB male connector, 407, as well as the other associated electronics shown in the block diagrams of FIG. 3. The second electronic assembly, 405, is screwed to the bottom, 402, using the standoffs, 411. The top, 401, and bottom, 402, are held together using screws and threaded inserts shown collectively as 410. The threaded inserts are placed in the top and the screws pass thru the bottom.

The cover, 404, can be removed when the USB male connector is to be inserted into a USB host for data transfer and or for power. The cover is held in place using friction latches made using a bar on the cover, 409, and selectively placed grooves, 409, on the top and bottom. When placed on the front of the UDRIVE, the cover, 403, completely encloses and protects the USB connector, 407. When the cover is removed for use of the USB interface, it may be conveniently placed onto the back of the base.

Figure 4B:
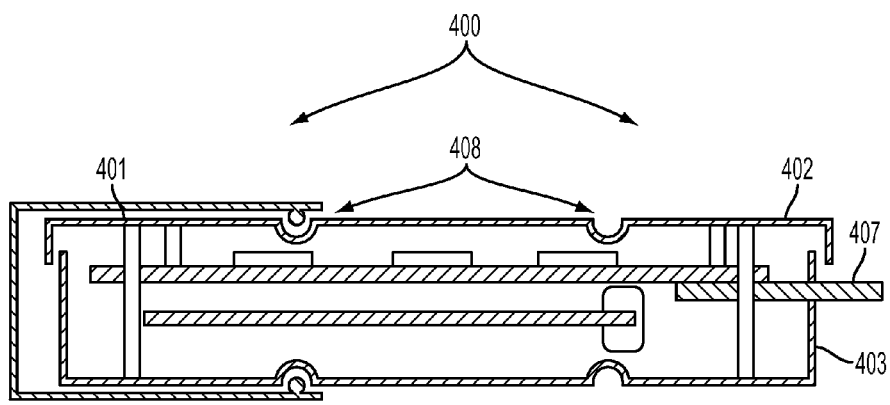

FIG. 4B shows the cover placed on the back of the UDRIVE allowing the USB connector, 407, to be inserted into a compatible USB female host connector.

Figure 4C:
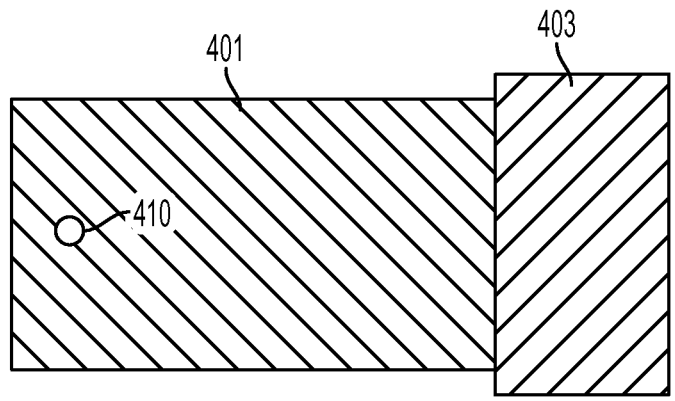
Figure 4D:
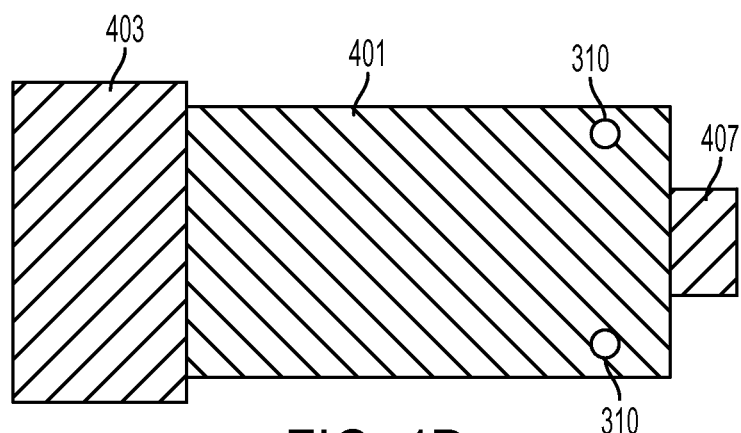

When access to the UDRIVE electronics is required by the user to change the internal mass storage module, the user removes the three screws, 410, and separates the top and bottom. The screw positions are shown in FIGS. 4C and 4D, which show the UDRIVE assembly top view.

The added electronic components excluding the battery of the UDRIVE block diagrams of FIGS. 3C, and 3D can be placed in a UDRIVE similar to FIG. 4B shown in with the switches, LED's, USB OTG port, and micro SD port placed on the second electronic assembly, 406. User access to the switches, OTG port and micro SD port of FIG. 3D can be provided by adding suitable holes in the top, 401, and bottom, 402, mechanical assemblies.

Figure 5:
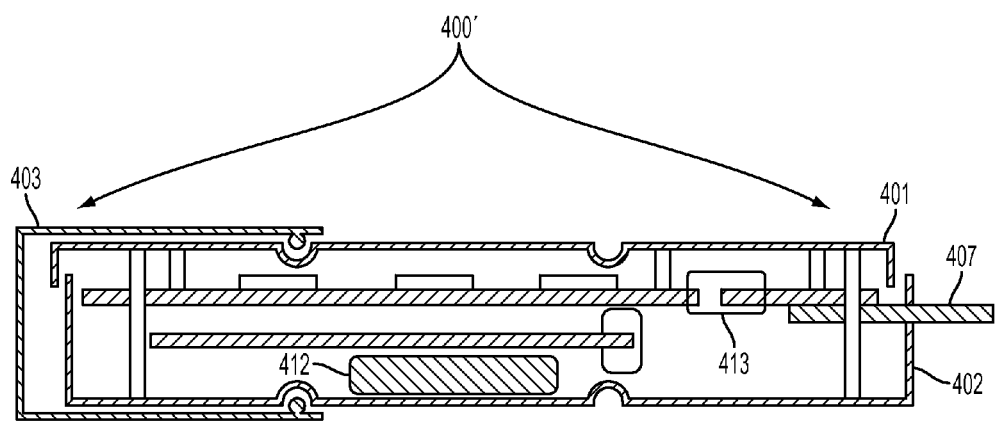
FIG. 5 shows a modified version of the embodiment of FIGS. 4A-4D that includes the interchangeable USB connector and a battery.

FIG. 5 shows a modified version of the embodiment of FIGS. 4A-4D that includes the interchangeable USB connector and a battery.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended.

What is claimed is:

1. A portable USB device comprising:
    a removable Solid State Drive connected to an electronic assembly which has an electronic bridge that connects the removable Solid State Drive to a USB device data channel;
    wherein the USB device data channel acts as a primary device USB interface,
    wherein the USB device data channel being a USB male connector, which is capable of connecting to a USB host that provides a data interface and/or power interface,
    wherein the portable USB device resides in a case that has a length, width, and height dimensions of not more than 5 inches long, 2 inches wide, and 1 inch thick, and
    wherein the case encloses and protects the USB male connector and electrical contacts of the USB male connector when not in use.

2. The portable USB device of claim 1, wherein the USB device channel is a USB 2.0 male compliant connector.

3. The portable USB device of claim 1, wherein the USB device channel is a USB 3.0 male compliant connector.

4. The portable USB device of claim 1, wherein the USB device channel is a USB 3.1 male compliant connector.

5. The portable USB device of claim 1, wherein the USB device channel is on a removable assembly allowing any one of the male connectors providing interfaces described in claim 2, 3, or 4 to be used.

6. The portable USB device of claim 1, wherein the removable Solid State Drive is a MO-300b JEDEC compatible memory module.

7. The portable USB device of claim 1, wherein the removable Solid State Drive is a M.2 JEDEC compatible memory module.

8. The portable USB device of claim 1, further comprising a rechargeable battery recharged by using the USB device channel.

9. The portable USB device of claim 1, that includes means to allow access to removable Solid State Drive through a secure connection provided by electronics on the removable Solid State Drive.

10. The portable USB device of claim 1, that includes means to allow access to the removable Solid State Drive through a secure connection external to the removable Solid State Drive.

* * * * *